United States Patent
Yanagihara et al.

(10) Patent No.: US 10,852,968 B2
(45) Date of Patent: Dec. 1, 2020

(54) TECHNIQUES FOR MANAGING MEMORY ALLOCATION WITHIN A STORAGE DEVICE TO IMPROVE OPERATION OF A CAMERA APPLICATION

(71) Applicant: Apple Inc., Cupertino, CA (US)

(72) Inventors: Kazuhisa Yanagihara, Cupertino, CA (US); Benjamin P. Englert, San Jose, CA (US); Cameron S. Birse, San Jose, CA (US); Susan M. Grady, Scarborough, ME (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/137,341

(22) Filed: Sep. 20, 2018

(65) Prior Publication Data
US 2019/0339885 A1 Nov. 7, 2019

Related U.S. Application Data

(60) Provisional application No. 62/668,185, filed on May 7, 2018.

(51) Int. Cl.
*G06F 3/06* (2006.01)
*G06T 1/60* (2006.01)
(Continued)

(52) U.S. Cl.
CPC .......... *G06F 3/0631* (2013.01); *G06F 3/0608* (2013.01); *G06F 3/0679* (2013.01);
(Continued)

(58) Field of Classification Search
CPC .... G06F 3/0631; G06F 3/0679; G06F 3/0608; G06F 12/0238; G06N 20/00; G06T 1/0007; G06T 1/60
(Continued)

(56) References Cited

U.S. PATENT DOCUMENTS 6,065,100 A * 5/2000 Schafer ............... G06F 12/0866
711/137
6,185,737 B1 * 2/2001 Northcutt ............... H04L 29/06
348/E7.082
(Continued)

OTHER PUBLICATIONS

PCT Patent Application No. PCT/US2019/027061—International Search Report and Written Opinion dated Jul. 31, 2019 pp. 1-10.

*Primary Examiner* — Tuan V Thai
*Assistant Examiner* — Edward Waddy, Jr.
(74) *Attorney, Agent, or Firm* — Dickinson Wright RLLP

(57) ABSTRACT

This application sets forth techniques for managing the allocation of memory storage space in a non-volatile memory to improve the operation of a camera application. A camera application monitors an amount of available memory storage space in the non-volatile memory. Responsive to various triggering events, the camera application compares the amount of available memory storage space to a threshold value. When the amount of available memory storage space is less than the threshold value, the camera application transmits a request to a background service to free additional memory storage space within a temporary data store associated with one or more applications installed on the computing device. The temporary data store provides a location for local data to improve the efficiency of the applications, which can be exploited by the camera application to free up memory to avoid a low-memory condition that could prevent the camera application from performing certain operations.

20 Claims, 9 Drawing Sheets

(51) Int. Cl.
*G06T 1/00* (2006.01)
*G06F 12/02* (2006.01)
*G06N 20/00* (2019.01)

(52) U.S. Cl.
CPC ......... *G06F 12/0238* (2013.01); *G06N 20/00* (2019.01); *G06T 1/0007* (2013.01); *G06T 1/60* (2013.01)

(58) Field of Classification Search
USPC ...... 711/1, 170, 133, 135, E12.001, E12.008
See application file for complete search history.

(56) References Cited

U.S. PATENT DOCUMENTS

| | | |
|---|---|---|
| 8,564,683 B2 | 10/2013 | Easwar et al. |
| 9,384,096 B2 | 7/2016 | Hackborn et al. |
| 9,465,734 B1 | 10/2016 | Myrick et al. |
| 2007/0129058 A1 | 6/2007 | Landschaft et al. |
| 2009/0198952 A1 | 8/2009 | Khmelnitsky et al. |
| 2010/0318745 A1 | 12/2010 | Wheeler et al. |
| 2011/0191526 A1* | 8/2011 | Haukness ............... G11C 29/50 711/103 |
| 2012/0179882 A1 | 7/2012 | Bernhard, III et al. |
| 2015/0067238 A1 | 3/2015 | Marcu et al. |
| 2015/0146026 A1 | 5/2015 | Walker et al. |
| 2015/0370486 A1 | 12/2015 | Bairavasundaram et al. |
| 2018/0212959 A1* | 7/2018 | Mukherjee ......... H04N 21/4532 |
| 2019/0081850 A1* | 3/2019 | Nazar ................. H04L 41/0631 |
| 2019/0251025 A1* | 8/2019 | Liu ........................... G06F 8/62 |

* cited by examiner

TECHNIQUES FOR MANAGING MEMORY ALLOCATION WITHIN A STORAGE DEVICE TO IMPROVE OPERATION OF A CAMERA APPLICATION

CROSS-REFERENCE TO RELATED APPLICATIONS

The present application claims the benefit of U.S. Provisional Application No. 62/668,185, entitled "TECHNIQUES FOR MANAGING MEMORY ALLOCATION WITHIN A STORAGE DEVICE TO IMPROVE OPERATION OF A CAMERA APPLICATION," filed May 7, 2018, the content of which is incorporated herein by reference in its entirety for all purposes.

FIELD

The described embodiments relate generally to memory allocation procedures for storage devices. More particularly, the present embodiments relate to techniques that involve managing a temporary data store for specific applications in accordance with fluctuating memory storage space conditions on a computing device.

BACKGROUND

A modern storage device—e.g., a high-capacity solid state drive (SSD) or hard disk drive (HDD)—included in a computing device can enable a variety of applications to be installed on the computing device and store considerable amounts of data. In some cases, a given application can require a specific amount of memory storage space within the storage device to be available in order to effectively carry out various operations, e.g., downloading data from a remote server or storing a file generated by the application. In some cases, it can be desirable for certain data to be retained within the storage device as cache data if the data is frequently accessed by the application. In particular, cache data can provide a more enjoyable user experience as the cache data reduces the latency or resources that are otherwise involved in accessing the data from a remote data store in a reactive manner, e.g., in response to a user seeking to access the data at a later time.

Notably, as the unallocated memory within the storage device is consumed to store ever increasing amounts of cache data for a number of different applications, the computing device may become incapable of operating in an optimal manner. For instance, problems can arise when a given application attempts to perform an operation and not enough free memory is available within the storage device. For example, a camera application attempting to capture a digital image or video can experience failures when the storage device does not have enough free memory available to allocate for storing the image or video file locally within the storage device. Lack of available memory may prevent a user from being able to use the device in the intended manner, which degrades the user experience of the computing device.

SUMMARY

Accordingly, representative embodiments set forth herein disclose techniques that involve managing allocated memory within a storage device in anticipation of specific use scenarios for a given application.

One embodiment sets forth a method for managing available memory storage space to improve operation of a camera application. In particular, the method can be implemented by the computing device, and involves monitoring an amount of available memory storage space in a non-volatile memory of the computing device. Responsive to various triggering events, the camera application compares the amount of available memory storage space to a threshold value. When the amount of available memory storage space is less than the threshold value, a request can be transmitted to a background service to attempt to pro-actively free additional memory storage space by purging data from within a temporary data store associated with one or more applications installed on the computing device. The temporary data store is allocated to provide a location for cache data to be stored by a variety of applications to improve the efficiency of the applications. The nature of data stored in the temporary data store can be exploited such that the camera application can automatically free memory storage space to prevent a low-memory condition from halting normal operation of the camera application.

In some embodiments, the triggering events can include: launching or resuming the camera application within an operating environment of the computing device; changing a mode of operation of the camera application; initiating a capture of an image or video via a user interface of the camera application; providing an image file or a video file to a library service for storage; or terminating video capture via a user interface of the camera application. The triggering events can also include receiving a notification from a file system of the computing device that the amount of available memory storage space has been modified.

In some embodiments, the threshold value is selected from one of a plurality of threshold values based on a mode of operation of the camera application. For example, different threshold values can be selected based on whether the camera application is operating in a photo mode versus a video mode.

In some embodiments, the threshold values can be dynamically adjusted based on historical user data related to the camera application. In other embodiments, the threshold values can be adjusted based on at least one of a location of the computing device, a time (e.g., time of day), or a date (e.g., day of the week).

In some embodiments, the threshold values can be dynamically adjusted based on a machine learning algorithm that is trained utilizing historical user data related to the camera application on a plurality of different computing devices. The machine learning algorithm can be included within a network-based service that is configured to provide threshold values to the camera application in response to a supplied input vector.

In some embodiments, the background service is a cache engine implemented as a background process within the computing device. The cache engine manages the allocation of memory storage space within the temporary data store to one or more applications. In some embodiments, the cache engine, responsive to receiving a request from the camera application, selects one or more applications to request a reduction in data in the temporary data store. In other embodiments, the cache engine purges data from the temporary data store directly rather than requesting each application delete data controlled by that application.

In some embodiments, the set of one or more applications can be selected based on a priority value assigned to each application in the one or more applications. The priority value can be assigned based on responses from each of the one or more applications to previous requests to delete data from the temporary data store. In other embodiments, the priority value can be assigned based on a frequency of use of each of the one or more applications.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
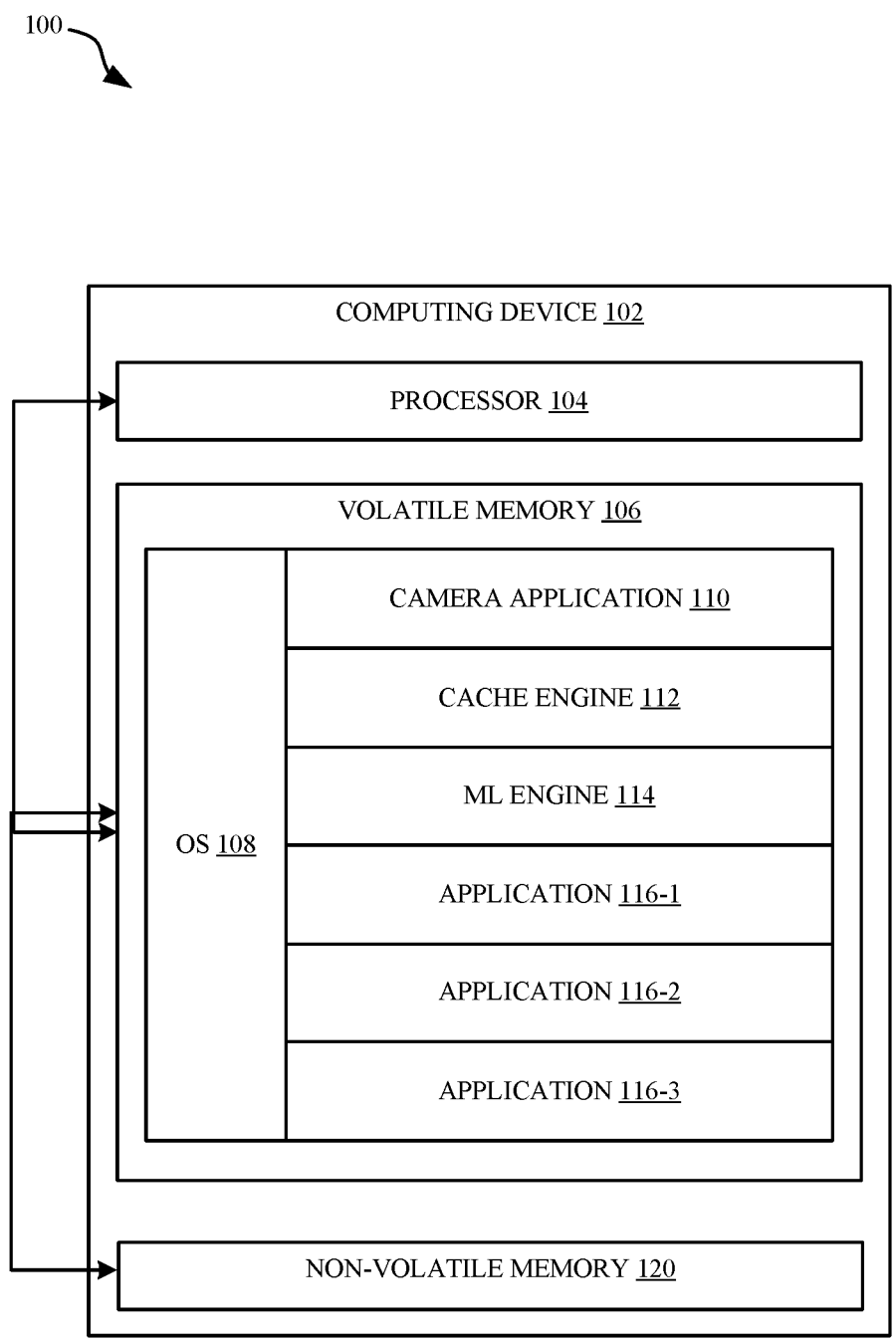
FIG. 1 illustrates an overview of a system that can be configured to perform the various techniques described herein, in accordance with some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

As previously described above, certain applications may require a threshold amount of available memory in order to complete some operations. A camera application is one such application that is particularly dependent on available memory for storing digital images and/or digital video files within a non-volatile memory of a computing device. While some operations have a known memory requirement, other operations may require an amount of memory that may not be known in advance of the operation. For example, capturing a single digital image in a particular format, without encoding, requires a particular amount of available memory known in advance based on the resolution of the image and a format for storing pixel data. However, capturing a digital video requires an amount of memory that is not known in advance because a user may determine the length of the captured video after the operation is initiated. Furthermore, even if the amount of memory required to capture a single image is known in advance, a user can decide to capture a number of images in succession, causing the memory requirement to increase proportionally to the number of images captured in a short period of time.

In conventional camera applications, a user interface could be configured to simply inform the user when an amount of available memory in a storage device was below a particular threshold necessary to complete a requested operation. In other instances, an operation could be started and then the user was only informed that memory availability was an issue when the operation failed, such as when an amount of available memory was exhausted while capturing a digital video. All of these options may be undesirable to a user that would prefer the computing device to attempt to free additional memory automatically in order to complete the operation.

In some embodiments, various applications are configured to utilize a temporary data store to improve the efficiency of the application. For example, a web browser application can be allocated space within a storage device to store copies of web assets downloaded from one or more servers. The web assets can be accessed locally from the temporary data store instead of requesting the web assets from the one or more servers repeatedly in order to speed up retrieval when a user accesses the same data repeatedly. As another example, a photo sharing application can be configured to store a user's digital images within a cloud-based storage solution. However, the photo sharing application can be configured to store thumbnails of some or all of the images locally within a temporary data store to allow a user to quickly browse the images stored remotely. The photo sharing application can also be configured to store a subset of the images locally in the temporary data store based on anticipated usage (e.g., most recently viewed photos, most frequently viewed photos, etc.).

In some embodiments, a camera application includes a storage interface that includes logic configured to automatically attempt to free up memory resources within a storage device in anticipation of one or more operations being performed using the camera application. The camera application determines an amount of free memory within a storage device. The camera application compares the amount of free memory to one or more thresholds based on, at least in part, an estimated amount of free memory required to complete an operation. In some embodiments, the threshold values for each type of operation can be dynamically adjusted based on historic user data associated with previously executed operations by a particular user or by a number of additional users utilizing other computing devices.

In response to the comparison, the camera application can request additional memory from one or more applications be freed such that the camera application can complete the anticipated operation. In some embodiments, the camera application can transmit a request to a background service that manages allocations within a temporary data store. Each application allocated memory storage space in the temporary data store can delete data from the application's portion of the temporary data store in order to free those allocated blocks of memory to be used by the camera application to store data. The background service can transmit a response to the camera application that indicates an amount of memory storage space that was freed as a result of the request. The camera application can then compare the new amount of free memory to the one or more thresholds. If the new amount of free memory is above the one or more thresholds, then the camera application can complete the operation. However, if the new amount of free memory is still below at least one of the one or more thresholds, then the camera application can prevent at least one operation from being performed. If any operation is prevented from being performed, then a user of the computing device can be informed of the inability to complete an operation through a graphical user interface, such as through a pop-up notification that is presented to the user on a display of the computing device.

A more detailed description of the various techniques described herein, and the manner in which they can be implemented, is provided below in conjunction with FIGS. 1-7.

Figure 7:
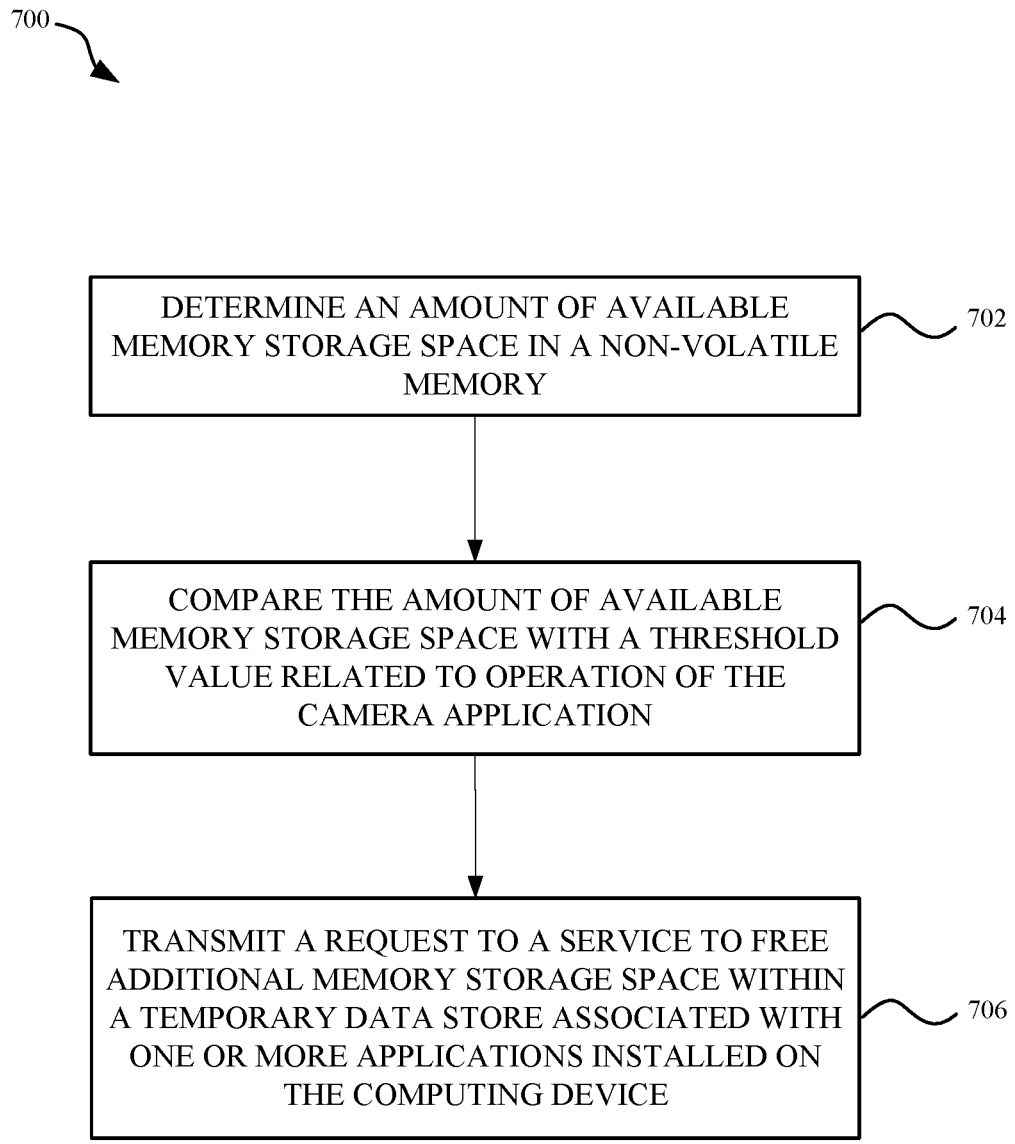
FIG. 7 illustrates a method for managing the allocation of storage space within a storage device, in accordance with some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 7, and that some components may be omitted from the illustration of FIG. 1 merely for simplification purposes. For example, the computing device 102 can include additional non-volatile memories (e.g., solid state drives, hard disk drives, etc.), other processors (e.g., a multi-core central processing unit (CPU)), and so on.

According to some embodiments, an operating system (OS) 108 can be loaded into the volatile memory 106, where the OS 108 can use or request execution of software that collectively enable the various techniques described herein to be implemented. As described in greater detail herein, such applications can include a camera application 110, a cache engine 112, a machine learning engine 114, one or more additional applications 116, and the like.

It should be noted that, although the procedures described herein are performed to free up storage space within the non-volatile memory 120, the described embodiments are not limited as such. For instance, according to some embodiments, the described procedures can be performed to free up storage space within the volatile memory 106 and/or other data storage devices coupled to the computing device 102. Additionally, it should be appreciated that the various procedures described herein can be generally performed at a file-system level. For instance, as will be described in greater detailed herein, the deletion of cache data can be initiated based on requests for one or more applications to delete files associated with the cache data. In this fashion, according to some embodiments, the described procedures can be performed on file systems that include, but are not limited to, local file systems, cloud-based file systems, and so on.

According to some embodiments, the camera application 110 can enable the computing device 102 to capture image data associated with an image sensor (not shown) coupled to the processor 104 and/or volatile memory 106. The image sensor can include a two-dimensional array of pixel sites that are designed to generate a voltage proportional to an intensity of light of a specific wavelength or band of wavelengths passing through a lens or lenses and striking the pixel site. The voltages can be sampled by logic included within the image sensor and read out in a serial manner to be stored as image data within a memory accessible to the processor 104. The camera application 110 can access the raw image data and generate image files or video files according to various file formats. In some embodiments, the camera application 110 encodes the raw image data to produce encoded image data stored within a file, such as JPEG (Joint Pictures Expert Group) image files or MPEG (Moving Pictures Expert Group) video files.

According to some embodiments, the cache engine 112 can be configured to manage allocation of memory addresses within a storage device to be utilized by one or more applications as a temporary data store. The data stored within the temporary data store may be referred to herein, collectively or individually, as cache data. Cache data may be distinguished from other data because the cache data exists in some other location that is accessible to the computing device 102 or is data that is not required for the application to operate. In some cases, the cache data represents a replicated copy of data accessible to the computing device 102 through other means. In other cases, the cache data represents non-essential information that may change the operation of an application to be, e.g., more efficient or better tailored to a particular user while not being required for the application to execute a variety of essential functions. For example, the cache data could include user preferences that tailors operation of a particular function to match a previous selection provided by a user; however, inability to access the user preferences does not affect the ability of the application to execute the function according to a default configuration. Consequently, the cache data can be deleted without adversely affecting the ability of the application to function, albeit, potentially in a less efficient or less desirable manner.

Each application, including the camera application 110, can be configured to request an allocation of memory storage space from a storage device, such as non-volatile memory 120, to use as a temporary data store. The application transmits the request to the cache engine 112, which translates the request into a file system level request sent to the OS 108. The OS 108 can grant the request and provide the cache engine 112 with a response that identifies a new allocation of memory storage space within the storage device. Alternatively, the OS 108 can deny the request and provide the cache engine 112 with a response that indicates that there is not enough free memory available on the storage device to allocate new memory storage space to the cache engine 112. The cache engine 112 can also release previously allocated memory storage space back into a free memory pool. Consequently, the cache engine 112 can dynamically adjust the memory storage space allocated to one or more temporary data stores for one or more corresponding applications based on the requirements of each application installed on the computing device 102.

The temporary data store allocated to a particular application can be used by the application to store cache data. The cache data can include but is not limited to image files, video files, web pages or other digital assets, thumbnails (e.g., reduced resolution representations of image files), documents, configuration data, user preferences, and so forth. The particular application can request increases or decreases in an amount of memory storage space allocated to the application by the cache engine 112 as part of the particular application's temporary data store.

According to some embodiments, the cache engine 112 can include additional functionality to reserve memory storage space within the non-volatile memory 120 that is freed by one or more applications. For example, the cache engine 112 can reserve memory storage space to increase a size of a temporary data store for a particular application.

According to some embodiments, the cache engine 112 can be configured to issue a request for a particular application to delete one or more files at a file system level. For example, the cache engine 112 can generate a request for an application to identify and delete one or more files for purposes of releasing at least a portion of the memory storage space allocated to that application's temporary data store. In some embodiments, each file stored in the temporary data store can be associated with a corresponding priority level. The application can comply with the request by identifying and deleting a subset of files associated with a priority level below a threshold priority level. Alternatively, the application can comply with the request by identifying and deleting one or more files having the lowest priority levels such that a size of the one or more identified files is equal to or greater than a threshold size. Alternatively, the application can refuse to comply with the request, in whole or in part, based on the priority level of particular files. For example, a request to identify and delete files may include a threshold priority level such that only those files below the threshold priority level should be deleted in order to comply with the request. In some instances, the application may be unable to identify one or more files for deletion that have a priority level below the threshold priority level, or that amount to a size greater than or equal to a threshold size. In such cases, the application can respond to the cache engine 112 that the application could not comply with the request.

According to some embodiments, the priority levels attributed to cache data can be determined by each application, and can vary between different applications in accordance with a respective cache data priority policy implemented by a particular application. The interaction of the cache engine 112 with the application(s) proceeds in a manner that allows each application to decide which cache data ultimately gets deleted.

It should be noted that, in some scenarios, the cache engine 112 can be configured to identify one or more applications that frequently comply with a request, issued by the cache engine 112, to delete one or more files. In this fashion, the cache engine 112 can prioritize requests to these compliant applications to delete the respective files over those applications that comply less frequently. By targeting the more compliant applications in this manner, the cache engine 112 can help the computing device 102 quickly obtain the desired freed up memory storage space.

According to some embodiments, the cache engine 112 can assign, based on user preference data or historical user data collected by the cache engine 112, priority rankings to each of the applications. The priority rankings indicate a frequency that each application is utilized by a user. Higher priority rankings are assigned to the applications that are frequently used, and lower priority rankings are assigned to the applications that are not frequently used. Based on the priority rankings, the cache engine 112 can prioritize requests to fee memory storage space to those applications that are used less frequently such that the temporary data store of applications used more frequently are less effected.

It should be noted that the described embodiments can be configured to enable the cache engine 112 to issue requests for applications to delete one or more files without waiting for each request to be fulfilled by each respective application. For instance, if the cache engine 112 issues a request for a first application to delete one or more files, the cache engine 112 can issue a different request to a different application, without waiting for the first application to comply with the first request. In this fashion, the computing device 102 can obtain a desired amount of memory storage much more quickly and efficiently.

According to some embodiments, components of the computing device 102 can be configured to perform the various procedures described herein as background tasks to minimize their interference with foreground or active tasks that are assigned a higher priority within the OS 108. Moreover, the various procedures described herein can exhibit deference to user-initiated requests for applications to perform operations. More specifically, the cache engine 112 can execute as a background task to adjust the allocated memory storage space of the temporary data store assigned to each application while the application(s) are executed as front-facing applications. Thus, allocating or freeing memory in the storage device is a low priority operation compared to operations initiated by the application(s).

According to some embodiments, the application(s) 116 can include various applications configured to be executed on the computing device 102. Examples of the application(s) 116 can include a photo sharing application, a document viewing application, a web browser, an email application, an audio application, a video playing application, and the like. It will be appreciated that although only three applications, such as a first application 116-1, a second application 116-2, and a third application 116-3, are shown in FIG. 1, more or less applications 116 can be included within the volatile memory 106 during operation of the computing device 102. Additional applications can be stored in the non-volatile memory 120 and loaded into the volatile memory 106 as the applications are targeted for execution by the OS 108. In some embodiments, applications 116 can also be loaded from a remote data store such as a server accessible to the computing device 102 through a network.

It will be appreciated that the cache engine 112 can be implemented as a collection of discrete components within the computing device 102 rather than as a single component. According to some embodiments, the cache engine 112 can include one or more components described in U.S. patent application Ser. No. 15/725,175 filed on Oct. 4, 2017, which is hereby incorporated herein in its entirety. For example, the cache engine 112 can include one or more of the user activity detector, the learning engine, the cache data deletion engine, the free memory allocator, and the memory allocation controller. One or more of these components can be utilized to implement the functionality of the cache engine 112, described herein.

In some embodiments, the applications executed by the computing device can rely on a machine learning engine 114 to provide various functionality to the applications. The machine learning engine 114 can implement a machine learning algorithm to perform certain operations. For example, the machine learning algorithm can include a convolution neural network configured to process input vectors and generate output vectors that classify the input vectors according to one of a plurality of classifications. This type of machine learning algorithm can be referred to as a classification algorithm. Of course, the machine learning engine 114 can implement other types of machine learning algorithms such as clustering algorithms, regression algorithms, density estimation algorithms, and reduction algorithms. The machine learning algorithms can be trained using supervised or unsupervised training techniques. In some embodiments, the camera application 110 can utilize the ML engine 114, as will be described in more detail below.

Accordingly, FIG. 1 provides a high-level overview of a system architecture that can be implemented by computing device 102 to effectively carry out the various techniques described herein. A more detailed breakdown of these techniques will now be provided below in conjunction with FIGS. 2-7.

Figure 2:
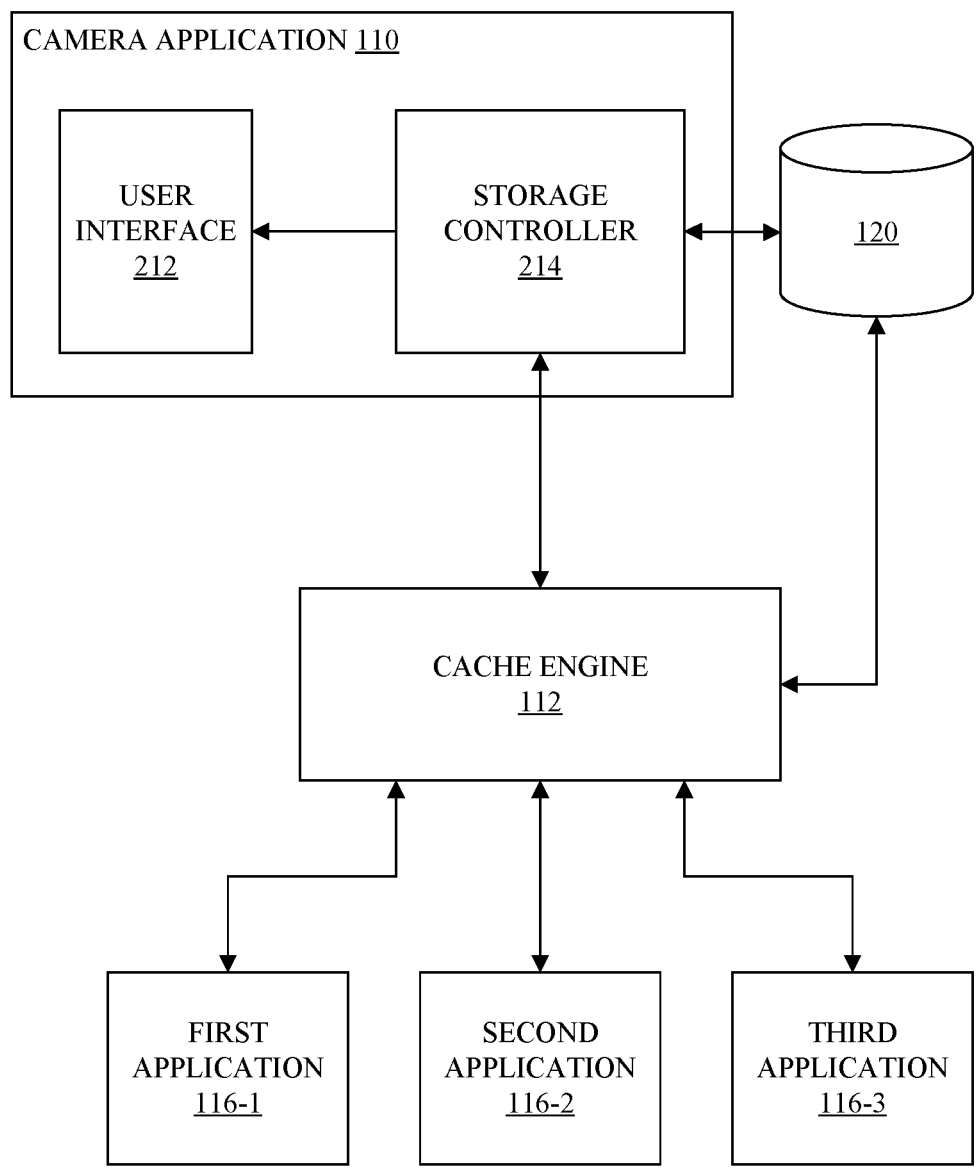
FIG. 2 illustrates an operating environment of a camera application executed by a computing device, in accordance with some embodiments.

FIG. 2 illustrates an operating environment of the camera application 110 executed by a computing device 102, in accordance with some embodiments. In particular, FIG. 2 depicts an operating environment 200 that includes the camera application 110 and the cache engine 112 as well as one or more applications 116. The camera application 110 further includes a user interface 212 and a storage controller 214. In some embodiments, the functionality of the user interface 212 and the storage controller 214 can be implemented within a single process or program. In other embodiments, the user interface 212 and the storage controller 214 can be implemented as separate processes, such as a primary process and a background process or service.

The camera application 110 enables a user to capture images or videos utilizing computing device 102. The user interface 212 provides controls to initiate reading of pixel data from an image sensor (not explicitly shown) attached to the computing device 102. For example, the user interface 212 can include user interface elements that enable a user to configure an image capture operation or a video capture operation. For example, the user interface elements can enable a user to select between capturing still images and video, selecting a particular storage format for the image or video files, and selecting configuration parameters associated with the image or video such as a digital zoom, resolution, frame rate, and the like.

In some embodiments, the user interface 212 is a graphical user interface (GUI) that is displayed on a display (not explicitly shown) of the computing device 102. The display can include a touch-sensitive surface that enables a user to interact with the user interface elements to control the camera application 110 using touch gestures such as tapping, swiping, pinching, and the like. The GUI can also include a display element that is configured to act as a viewfinder for the image sensor such that the user can view, in real-time, the image or video data captured through the image sensor.

The camera application 110 includes a storage controller 214 that enables the image files or video files to be written to a non-volatile memory 120. In some embodiments, the non-volatile memory 120 is a block storage device. The block storage device has a total capacity that is divided into a plurality of blocks (e.g., 1 megabyte (MB) blocks). The storage controller 214, operating through system calls to the operating system 108 or a software driver for the block storage device, can request allocation or deallocation of blocks of memory in the block storage device on which image files or video files can be stored. The operating system 108 and/or the software driver for the block storage device is configured to allocate or deallocate blocks of memory in response to requests received from a number of different applications.

It will be appreciated that the capacity of the non-volatile memory 120 is limited. In some instances, the amount of free memory storage space within the non-volatile memory 120 may be reduced below a threshold level, at which point the available memory storage space may be insufficient to accommodate the various memory allocation requests. This issue can be particularly problematic when a user is attempting to capture large image or video files, which can easily require tens of megabytes (MBs) of memory storage space or more. It would be desirable to be able to free up memory storage space, automatically, where possible when the storage controller 214 determines that the available memory storage space is below a threshold value.

Figure 3A:
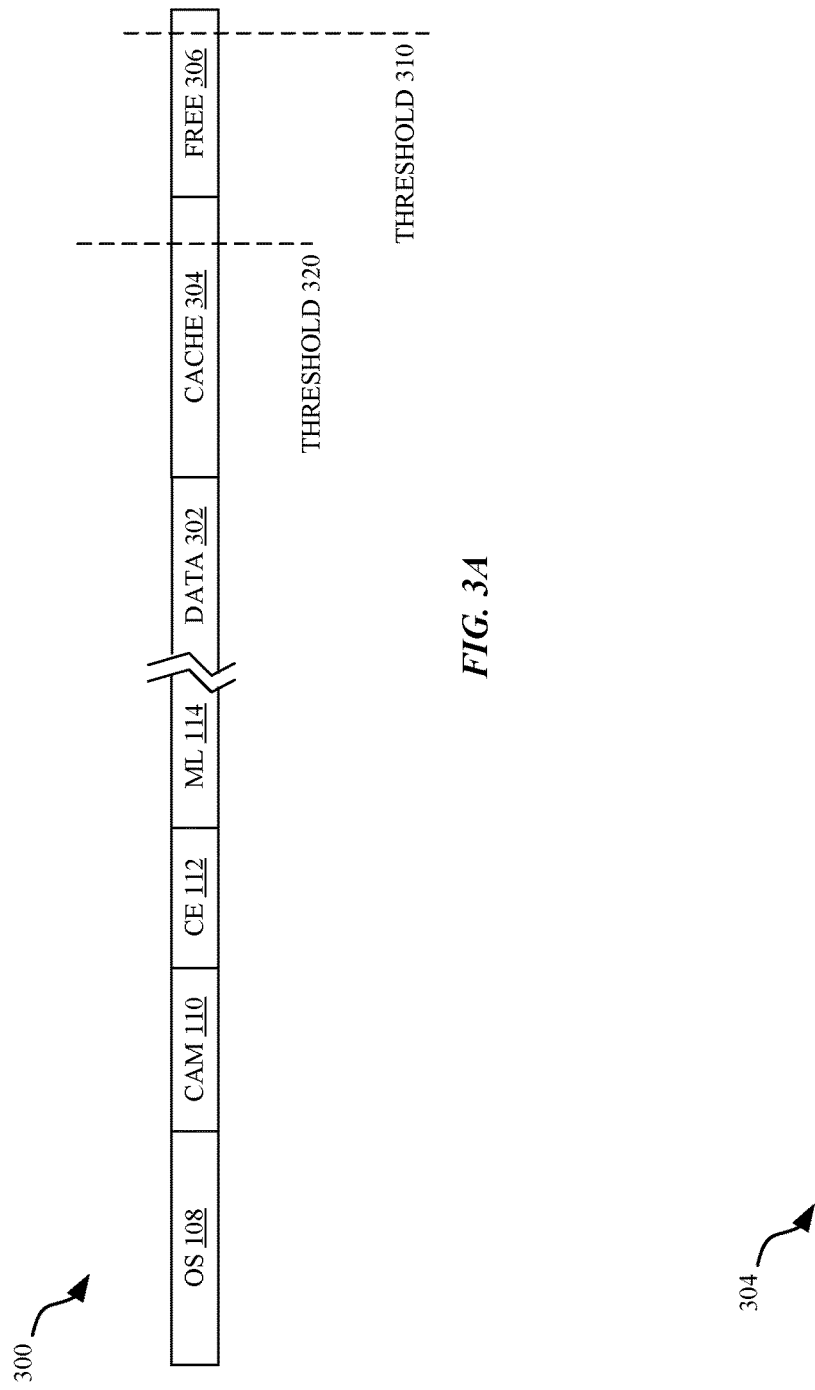
FIGS. 3A-3B illustrate an address space associated with the non-volatile memory of the computing device, in accordance with some embodiments.
Figure 3B:

FIGS. 3A-3B illustrate an address space 300 associated with the non-volatile memory 120 of the computing device 102, in accordance with some embodiments. As depicted in FIG. 3A, applications and data are stored in the non-volatile memory 120. The address space 300 is divided into blocks of memory corresponding to contiguous memory addresses. For example, each block of memory can refer to memory addresses corresponding to a contiguous block of 1 MB of memory. In some embodiments, the blocks of memory are larger or smaller than 1 MB. Furthermore, in some embodiments, the blocks of memory can be divided in a hierarchical manner such that the address space is subdivided into macro-blocks (e.g., 4 MB macro-blocks) and each macroblock can further be subdivided into a plurality of micro-blocks (e.g., 256 kB micro-blocks). In such embodiments, allocations can be made at either the macro-block level or the micro-block level.

A plurality of applications configured to be executed by the computing device 102 can be stored in the non-volatile memory 120. For example, the operating system 108 is stored in a first set of one or more blocks of memory allocated within the address space 300. In addition, the camera application 110 is stored in a second set of one or more blocks of memory allocated within the address space 300, the cache engine 112 is stored in a third set of one or more blocks of memory allocated within the address space 300, the machine learning engine 114 is stored in a fourth set of one or more blocks of memory allocated within the address space 300, and the one or more additional applications 116 (not explicitly shown) are stored in corresponding additional sets of one or more blocks of memory allocated within the address space 300. It will be appreciated that the applications do not have to be stored in contiguous blocks of memory within the address space. For example, a first portion of a first application 116-1 can be stored in a first subset of one or more blocks of memory allocated within the address space 300 and a second portion of the first application 116-1 can be stored in a second subset of one or more separate blocks of memory, non-contiguous with the first subset, allocated within the address space 300. Splitting related portions of applications or data up into non-contiguous portions of the non-volatile memory 120 can be referred to as fragmentation.

In addition to the applications discussed above, data 302 including one or more files can also be stored in a set of one or more blocks of memory allocated within the address space 300. In some embodiments, the cache engine 112 can request allocation of a temporary data store 304 within the address space 300. The temporary data store 304 can sometimes be referred to herein as a cache or, alternatively, data cache. The cache engine 112 permits various applications 116 to store data locally within the temporary data store 304 according to a set of policies. For example, as depicted in FIG. 3B, the cache engine 112 can allocate a first subset 304-1 of blocks of memory within the temporary data store 304 to a first application 116-1, a second subset 304-2 of blocks of memory within the temporary data store 304 to a second application 116-2, and a third subset 304-3 of blocks of memory within the temporary data store 304 to a third application 116-3.

In many instances, the total amount of allocated blocks of memory for storing applications and data can be less than a maximum capacity of the non-volatile memory 120. In such instances, a portion of the address space 300 remains unallocated as available memory storage space (e.g., free blocks) 306. It will be appreciated that the blocks of unallocated memory may not be contiguous within the address space 300.

Referring back to FIG. 2, the camera application 110 can be configured to store files in the non-volatile memory 120. For example, when a user takes a photo using the camera application 110, the camera application 110 can process the image data received from the image sensor, compress the image data using a particular compression/decompression algorithm to generate an image file, and then store the image file within the non-volatile memory 120 for long-term retrieval of said image file.

Notably, it is desirable for the camera application 110 to determine whether there is an estimated amount of available memory storage space 306 in order to complete an operation prior to the operation being performed. In other words, in anticipation of the camera application 110 being utilized to capture an image or video, it is desirable to check whether there is enough memory storage space in the non-volatile memory 120 that can be allocated to store the resulting image file or video file.

In some embodiments, the storage controller 214 of the camera application 110 can be configured to automatically attempt to free memory storage space within the non-volatile memory 120 in response to a detected low-memory condition. It will be appreciated that the storage controller 214 may not be able to free memory storage space directly. Instead, the storage controller 214 is configured to request a background service to free memory storage space.

In some embodiments, the storage controller 214, responsive to a triggering event, is configured to determine an amount of available memory storage space 306 in the non-volatile memory 120. The storage controller 214 can be configured to transmit a request to the operating system 108 to retrieve a total amount of available memory storage space 306 within the non-volatile memory 120. The storage controller 214 then compares the total amount of available memory storage space 306 to a threshold value 310. In some embodiments, the threshold value 310 represents an estimated amount of available memory storage space 306 that is sufficient to complete an operation. For example, if the total amount of available memory storage space 306 is less than 150 MB (e.g., the threshold value 310), then an image capture or a video capture operation will not be initiated by the camera application 110 because the operation is likely to fail. In some embodiments, the user interface 212 of the camera application 110 can inform a user that a particular operation is disabled due to a low-memory condition.

Ideally, the camera application 110 can be configured to automatically free up additional memory storage space within the non-volatile memory 120 when the total amount of available memory storage space 306 is proximate, but still greater than, the threshold value 310. For example, a second threshold value 320 can be defined that is greater than the first threshold value 310. In order to avoid reaching a point where the total amount of available memory storage space 306 is below the first threshold value 310, the storage controller 214 is configured to attempt to free additional memory storage space allocated to one or more applications within the temporary data store 304 to increase the total amount of available memory storage space 306 when the total amount of available memory storage space 306 is less than a second threshold value 320 but greater than the first threshold value 310. For example, the second threshold value 320 can be, e.g., 250 MB or 100 MB above the first threshold value 310. When the total amount of available memory storage space 306 drops below the second threshold value 320, the storage controller 214 attempts to pre-emptively free memory storage space to avoid dropping below the first threshold value 310.

In some embodiments, when the storage controller 214 determines that the amount of available memory storage space 306 in the non-volatile memory 120 is below the second threshold value 320, the storage controller 214 transmits a request to a background service to request the release of memory storage space allocated to the temporary data store 304. The background service can comprise the cache engine 112, which attempts to release memory storage space within the temporary data store 304 in response to the request. It will be appreciated that the background service can comprise any process executed by the computing device 102 to manage the temporary data store 304.

In some embodiments, the cache engine 112 transmits a request to one or more applications 116 to release memory storage space within the temporary data store 304. Each application 116 can be configured to conditionally delete data to comply with the request. In some embodiments, the cache engine 112 assigns a priority level to the request. The applications 116 then delete data (e.g., files) having a lower priority level that the priority level included in the request. The applications 116 can be configured to return a response to the cache engine 112 that indicates the files deleted in response to the request. Alternatively, the response can indicate a total amount of memory storage space freed by the application 116, a number of blocks of memory previously allocated to the application 116 within the temporary data store 304 that have been released by the application 116, or similar indications of the extent the application 116 has complied with the request. In some instances, an application 116 may not be able to delete any data from within the temporary data store 304 because none of the data is associated with a priority level below the priority level included in the request. In such instances, the response can indicate that the application 116 has failed to comply with the request, either partially or entirely.

The cache engine 112 can track the amount of available memory storage space 306 in the non-volatile memory 120 that is freed in response to one or more requests, and issue additional requests if necessary. For example, the cache engine 112 can increase the priority level indicated within the request such that additional data of a higher priority can be deleted from the temporary data store 304 by the applications 116. Alternatively, the cache engine 112 can send additional requests to one or more additional applications 116.

In some embodiments, the cache engine 112 can maintain data structures that indicate priority levels for each of the plurality of applications 116 that have been allocated memory storage space within the temporary data store 304. The cache engine 112 can be configured to transmit requests to delete data from within the temporary data store 304 to low priority applications 116 in a first pass. If the amount of memory storage space that is deleted by the applications in response to the requests is insufficient to increase the total amount of available memory storage space 306 above the second threshold value 320, then the cache engine 112 can be configured to transmit requests to delete data from within the temporary data store 304 to higher priority applications 116 in at least one additional pass. The priority level assigned to each application 116 can be indicative of a type of data stored by the application 116 within the temporary data store 304 (e.g., how important the data is to operation of the application 116), a measure of how easily the data can be retrieved from an alternative source (e.g., how likely can the data be retrieved from a network-based source), or any other measure that ranks data for the application 116 relative to data from other applications 116.

In some embodiments, the priority level assigned to each application 116 can be based on response data received from each of the applications 116. The cache engine 112 can be configured to track the responsiveness of each application to a request as historical user data. For example, the cache engine 112 can track an average amount of memory released by each application 116 in response to previously issued requests. Applications that are more responsive to previously issued requests can then be assigned a lower priority level than applications that are less responsive to previously issued requests such that new requests to delete data within the temporary data store 304 are sent to more responsive applications over less responsive applications.

In some embodiments, the storage controller 214 can be configured to check the amount of available memory storage space 306 in the non-volatile memory 120 responsive to one or more triggering events. The triggering events can include, but are not limited to: (1) launching the camera application 110 on the computing device 102; (2) resuming the camera application 110 which was previously executing in a background process; (3) initiation of an image capture or video capture operation, e.g. using a user interface element of the user interface 212; (4) detecting a change in a mode of operation of the camera application 110; (5) detecting a change in configuration parameters of a mode of operation of the camera application 110; (6) transmission of a captured image or video to a different application 116, such as a photo library application/service or a cloud storage application; (7) conclusion of an image capture or video capture operation, e.g., when the storage controller 214 writes an image file or video file to the non-volatile memory 120.

In some embodiments, the triggering event can be tracked by a separate process or application, and notification of the triggering event is sent to the camera application 110. For example, a file system of the computing device 102 can monitor the amount of available memory storage space and issue a notification to the camera application 110 when the amount of available memory storage space has been modified. Alternatively, the file system can set a threshold value, and a notification is sent to the camera application 110 when the amount of available memory storage space drops below the threshold value.

Figure 4:
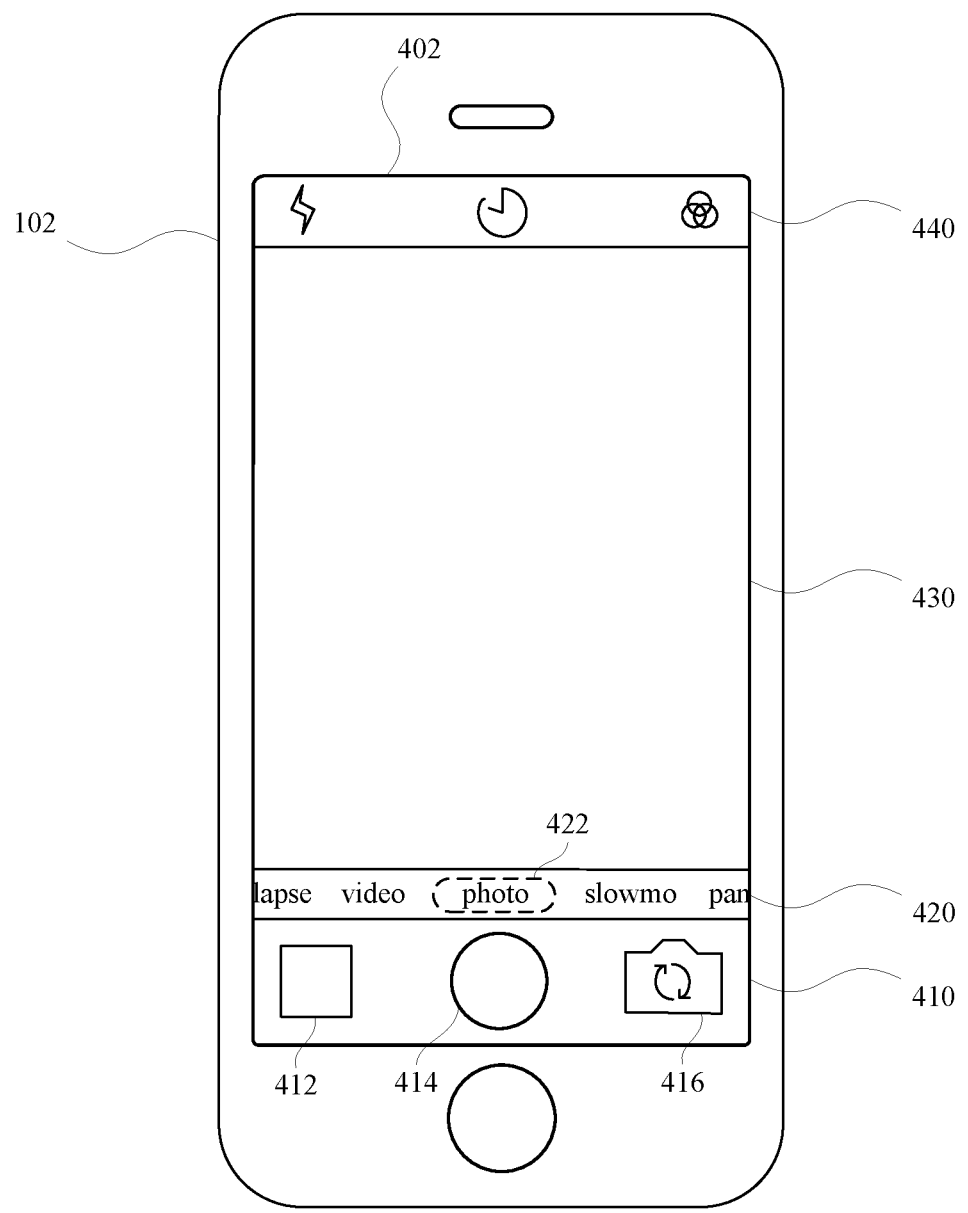
FIG. 4 illustrates a graphical user interface of the camera application, in accordance with some embodiments.

FIG. 4 illustrates a graphical user interface (GUI) 400 of the camera application, in accordance with some embodiments. The GUI 400 can be implemented by the user interface 212 of the camera application 110. The GUI 400 is displayed on a display 402 of the computing device 102. Although the GUI 400 is shown as displayed on a mobile phone, other implementations are contemplated as being within the scope of the present disclosure, such as the GUI 400 being implemented on a display 402 of a laptop computer, tablet computer, digital camera, or other type of consumer electronic device.

The GUI 400 includes different regions that include various user interface elements. For example, as depicted in FIG. 4, the GUI 400 includes a first region 410, a second region 420, a third region 430, and a fourth region 440. The first region 410 includes user interface elements such as a first user interface element 412 that displays a thumbnail of the previously captured image stored in a photo library, a second user interface element 414 that operates as a virtual shutter button, and a third user interface element 416 that operates to switch a mode of operation between a first image sensor associated with a rear surface of the computing device 102 and a second image sensor associated with a front surface of the computing device 102. The second region 420 implements a mode wheel user interface element 422 that enables a user to select a particular mode of operation of the camera application 110. For example, the mode wheel user interface element 422 allows the user to select between a photo mode, a video mode, a slow motion capture mode, a panoramic capture mode, and a time lapse capture mode. Other modes of operation are contemplated within the camera application 110 as being selectable with the mode wheel user interface element 422.

The third region 430 provides a digital viewfinder that displays real-time image data as captured by the image sensor. The fourth region 440 includes user interface elements to set various configuration parameters associated with the current mode of operation, such as whether a flash/strobe element is activated, whether image capture is delayed for a number of seconds after detecting the shutter button being pressed, or whether one of a plurality of digital filters is applied to the image or video in post processing.

It will be appreciated that the GUI 400 is only one such GUI that could be implemented for the camera application 110. Different user interface elements to select various modes of operation or set various configuration parameters associated with image or video capture are contemplated as being within the scope of the present disclosure.

Figure 5A:
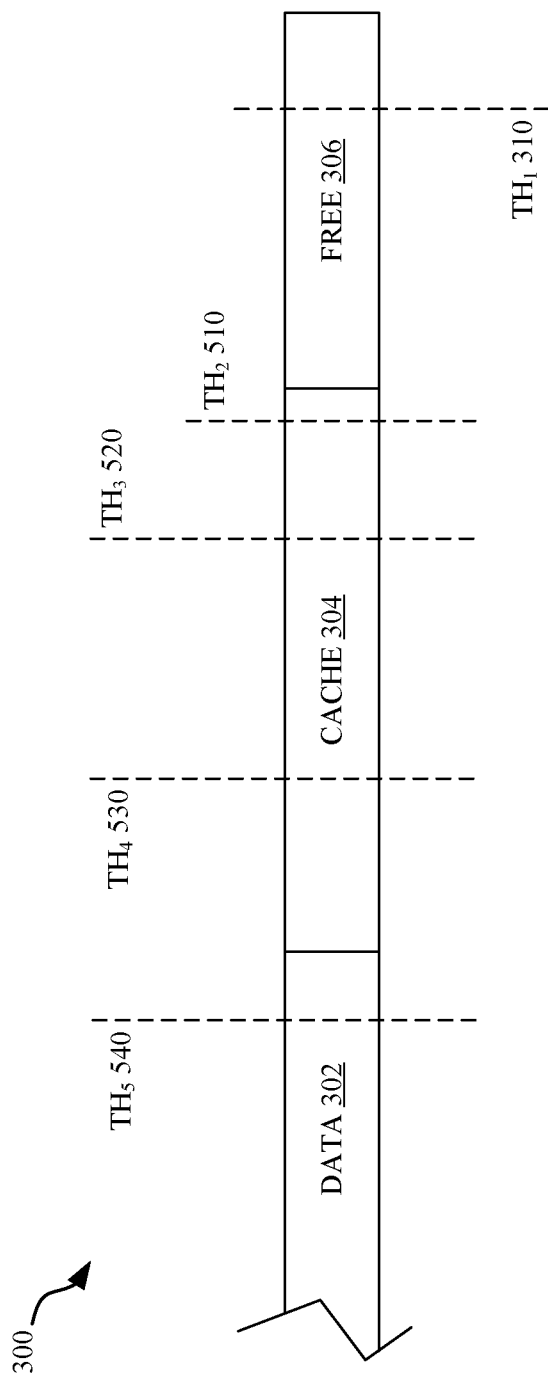
FIG. 5A illustrates dynamic thresholds associated with different modes of operation of the camera application, in accordance with some embodiments.

FIG. 5A illustrates dynamic thresholds associated with different modes of operation of the camera application 110, in accordance with some embodiments. As depicted in FIG. 5A, data 302, temporary data store 304, and available memory storage space 306 are included in the address space 300. The first threshold value 310 is also shown in FIG. 5, and it will be appreciated that the available memory storage space 306 is greater than the first threshold value 310.

Again, in some embodiments, a second threshold value can be defined as a preferred amount of available memory storage space 306 available during operation of the camera application 110. However, in some embodiments, the storage controller 214 can maintain different second threshold values for the preferred amount of available memory storage space 306 corresponding to two or more different modes of operation of the camera application 110.

For example, as depicted in FIG. 5A, a second threshold value 510 can be associated with a photo mode, a third threshold value 520 can be associated with a live photo mode, a fourth threshold value 530 can be associated with a panoramic photo mode, and a fifth threshold value 540 can be associated with a video capture mode. As the user interface 212 detects that the mode of operation changes between two or more different modes of operation, such as when a user selects an active mode of operation with the mode wheel user interface element 422, the storage controller 214 is configured to compare the total amount of available memory storage space 306 to a different threshold value corresponding to the active mode of operation of the camera application 110. If the total amount of available memory storage space 306 is less than the selected threshold value, then the storage controller 214 requests the cache engine 112 to free additional memory to increase the total amount of available memory storage space 306. The cache engine 112 will attempt to free enough memory such that the total amount of available memory storage space 306 is greater than the selected threshold value, which can be changed depending on the mode of operation of the camera application 110.

It will be appreciated that, in some instances, the amount of available memory storage space that can be freed within the temporary data store 304 is insufficient to increase the total amount of available memory storage space to be greater than the selected threshold value. For example, the fifth threshold value 540 is greater than the available memory storage space 306 and the temporary data store 304 combined such that, even if all of the memory storage space within the temporary data store 304 were freed, the total amount of available memory storage space 306 would still be less than the fifth threshold value 540. Still, the storage controller 214 will attempt to increase the available memory storage space 306 as much as possible to provide the maximum amount of available memory storage space 306 as is possible given the limits of the current memory allocation within the non-volatile memory 120.

Of course, it will be appreciated that the threshold values depicted in FIG. 5A are merely shown for illustrative purposes and that the actual threshold values implemented by the storage controller 214 can be related to different modes of operation. Furthermore, each mode of operation can be associated with a different first threshold value 310 that prevents the camera application 110 from performing a certain operation due to a critical low-memory condition. For example, the camera application 110 can be configured to prevent an operation based on a first threshold value 310 of 50 MB when the camera application 110 is operating in an image capture mode; however, the camera application 110 can also be configured to prevent an operation based on a first threshold value 310 of 250 MB when the camera application 110 is operating in a video capture mode.

Figure 5B:
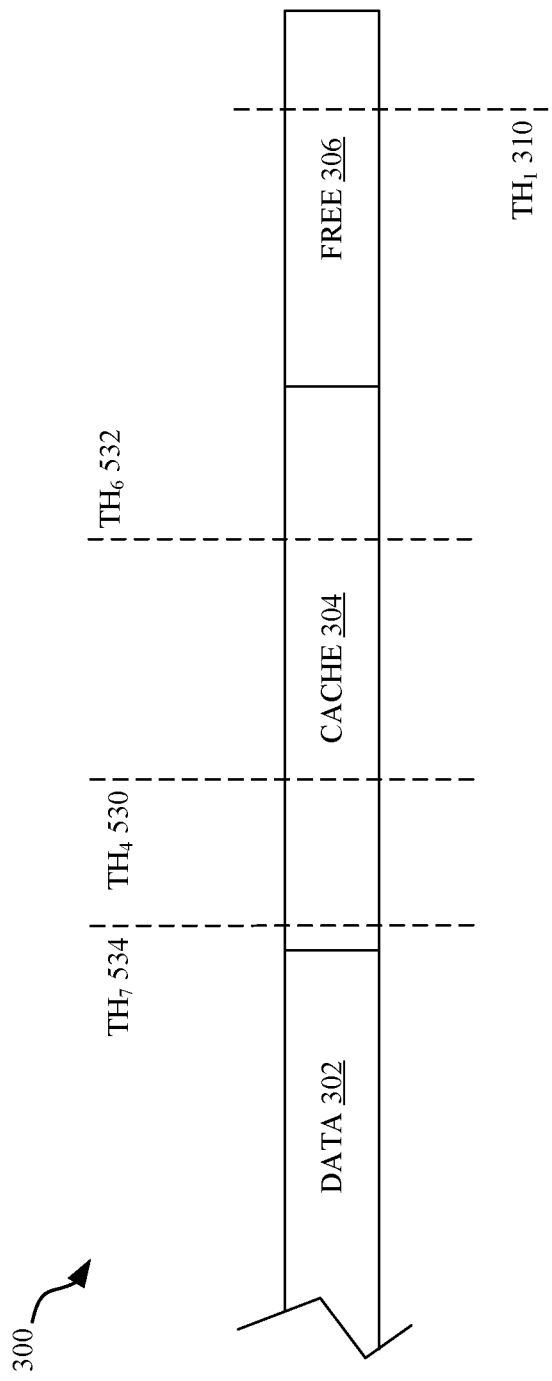
FIG. 5B illustrates dynamic thresholds associated with different configuration parameters for a single mode of operation of the camera application, in accordance with some embodiments.

FIG. 5B illustrates dynamic thresholds associated with different configuration parameters for a single mode of operation of the camera application, in accordance with some embodiments. As depicted in FIG. 5B, data 302, temporary data store 304, and available memory storage space 306 are included in the address space 300. The first threshold value 310 is also shown in FIG. 5B, and it will be appreciated that the available memory storage space 306 is greater than the first threshold value 310.

In some embodiments, the storage controller 214 maintains different threshold values for different configuration parameters within a particular mode of operation. For example, a different threshold value could be utilized within a video capture mode depending on a resolution of the captured video, a frame rate of the captured video, and/or a compression/decompression algorithm (CODEC) chosen to compress the captured video to store the captured video in a video file of a particular format. As another example, a photo mode could enable a user to set a compression level (e.g., low, moderate, high, etc.) for a particular CODEC. The current configuration parameters (e.g., the values for one or more configuration parameters associated with a particular mode of operation) can be mapped to a plurality of different threshold values.

As depicted in FIG. 5B, a fourth threshold value 530 can be associated with a panoramic photo mode. However, that threshold value 530 corresponds with a moderate level of compression of the resulting image file. The level of compression can, for example, be specified by a level of quantization within the JPEG image CODEC. Instead of maintaining one threshold value for the panoramic photo mode, additional threshold values can also be maintained for adapting to changes in the level of compression selected by a user or adjusted automatically by the camera application 110 (e.g., such as changing a level of compression in low light conditions). A sixth threshold value 532 corresponds with a low level of compression of the resulting image file in the panoramic photo mode, and a seventh threshold value 534 corresponds with a high level of compression of the resulting image file in the panoramic photo mode.

Generally, the plurality of threshold values as depicted in FIGS. 5A-5B can be set manually by a software developer. Alternatively, the plurality of threshold values can be changed dynamically based on operation of the camera application 110. In some embodiments, the threshold values are dynamically adjusted based on historical user data related to the camera application. Again, the storage controller 214 can track statistics related to operations performed with the camera application 110 on the computing device 102. Different users are likely to exhibit different behavior when utilizing the camera application 110. For example, one user may utilize the camera application 110 to take lots of low resolution photographs while another user may frequently utilize the camera application 110 to record videos ranging from a few seconds to a few minutes. The storage controller 214 can track an average amount of memory storage space required to complete an operation, over time, and adjust the threshold values dynamically based on this historical user data. The camera application 110 and, more specifically, the storage controller 214 can request an amount of available memory storage space 306 from the operating system 108 prior to an operation and then request a new amount of available memory storage space 306 from the operating system 108 subsequent to completing the operation. The difference between the amount prior to the operation and the amount subsequent to the operation can be stored as a statistic. Statistics from multiple operations can be compiled in a memory and analyzed to determine a threshold value for a particular mode of operation or active set of configuration parameters. For example a moving average over, e.g., the last 30 days of use can be tracked and used to set the threshold values for one or more modes of operation of the camera application 110.

In some embodiments, the historical user data can track how much memory storage space is required over a particular time period such as 10 seconds, 1 minute, or 5 minutes. Some users may frequently take multiple photos in quick succession while other users merely take one photo at a time. Even though each captured photo comprises a separate and distinct operation, multiple operations in quick succession can prevent the storage controller 214 from freeing additional memory storage space between the operations or in a background process of the computing device 102. Consequently, the threshold values are adjusted dynamically to account for the frequency of operations within a particular window.

In some embodiments, the storage controller 214 is configured to dynamically adjust the threshold values based on at least one of a location of the computing device, a time, or a date. A global positioning system (GPS) signal can be used to monitor the location of the computing device 102. The location associated with historical user data can be correlated with an expected behavior of the camera application 110 for a particular location, which is used to adjust the threshold value. A behavior of users can change based on location in a predictable way. For example, a user may use the camera application 110 when the user is at home or out with friends, but that same user could use the camera application 110 less frequently when the user is at work. Consequently, the storage controller 214 can associate locations (e.g., GPS coordinates) with historical user data related to various operations. The storage controller 214 can then calculate average amounts of memory storage space required for operations within a particular region or within a particular distance of various locations, and adjust the threshold values based on the differences in the estimated amounts of memory storage space for different locations. The threshold value selected during a particular comparison can then be adjusted based on a current location detected using a position sensor like a GPS sensor that detects GPS signals.

In some embodiments, the time or the date can be correlated with an expected behavior of the camera application 110, which is used to adjust the threshold value. A behavior of users may also change based on time of day (e.g., morning, afternoon, or evening) or a day of the week (e.g., weekday vs. weekend). The time or date associated with historical user data can be correlated with an expected behavior of the camera application 110 at particular times or dates, which can be utilized to adjust the threshold value. Consequently, the storage controller 214 can associate times or dates with historical user data related to various operations. The storage controller 214 can then calculate average amounts of memory storage space required for operations at particular times or dates, and adjust the threshold values based on the differences in the estimated amounts of memory storage space for different times or dates. The threshold value selected during a particular comparison can then be adjusted based on a current time or date detected using a timer or system clock of the computing device.

Figure 6:
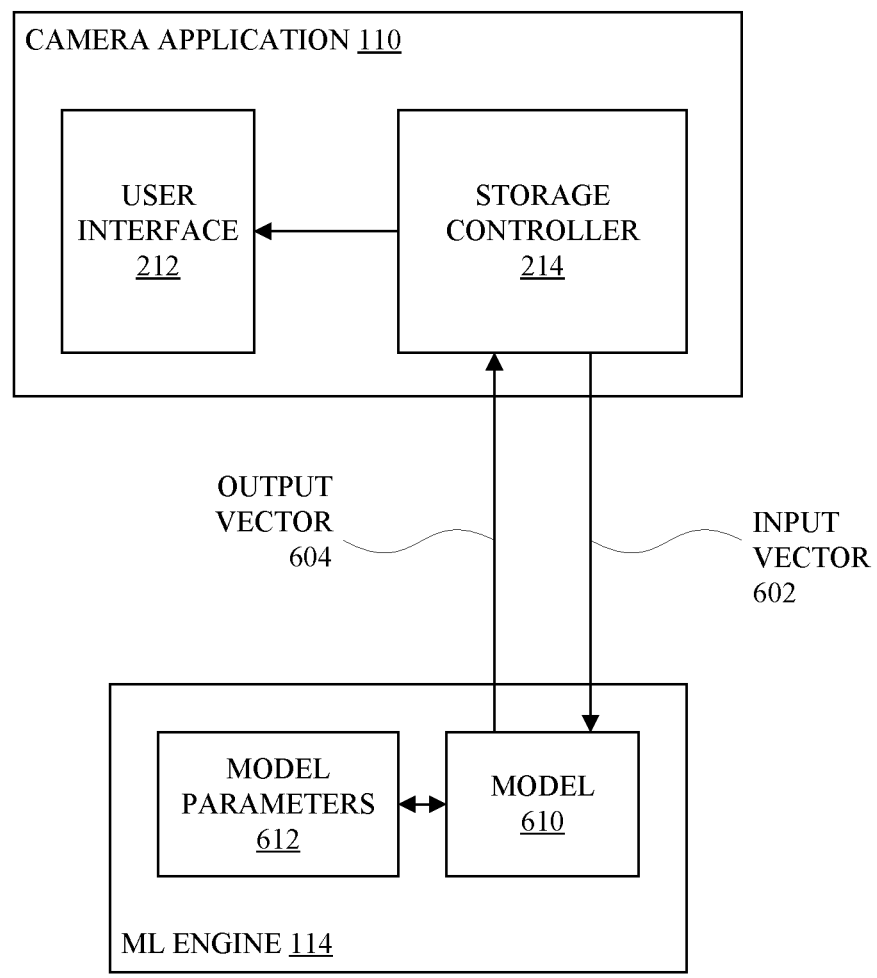
FIG. 6 illustrates a technique for dynamically adjusting threshold values utilizing a machine learning algorithm, in accordance with some embodiments.

FIG. 6 illustrates a technique for dynamically adjusting threshold values utilizing a machine learning algorithm, in accordance with some embodiments. The storage controller 214 is configured to utilize the machine learning engine 114 to dynamically adjust threshold values utilized in the determination on whether to free additional memory storage space 306 in the non-volatile memory 120. As depicted in FIG. 6, the storage controller 214 communicates with the machine learning engine 114, which includes a model 610 and model parameters 612. The model 610 implements a particular machine learning algorithm.

In some embodiments, the machine learning engine 114 is configured to receive an input vector 602 from the storage controller 214 and generate an output vector 604 by processing the input vector 602 by the model 610. The model 610 can be configured according to a set of model parameters 612 stored in a memory accessible by the machine learning engine 114. For example, the model 610 can be a convolution neural network (CNN) containing a number of layers, each layer associated with a different set of parameters in the model parameters 612. The CNN can reduce a large input vector 602 to a smaller output vector 604 that comprises a set of threshold values that match a classification based on the input vector 602.

In some embodiments, the model 610 is trained utilizing historical user data related to the camera application 110 on a plurality of different computing devices. The storage controller 214 can provide historical user data to a network-based service. The network-based service collects historical user data from a large number of users, and analyzes the historical user data to determine trends that are used to adjust the threshold values to match behavior of different users. In some embodiments, the historical user data is utilized to develop model parameters 612 that are then stored on various client devices such that the camera application 110 can determine thresholds utilizing the machine learning engine 114 stored on the client device.

In other embodiments, the machine learning engine 114 is stored remotely on a server computer and the machine learning algorithm is implemented as a network-based service. The storage controller 214 is configured to provide the network-based service with an input vector 602 that describes the camera application 110 for that particular computing device 102. The input vector 602 can include information about the non-volatile memory 120 and/or information related to historical user data collected for the camera application 110 by that computing device 102. The network-based service applies the input vector 602 to the machine learning algorithm to generate a set of threshold values in the output vector 604 that are sent to the storage controller 214 to be used with the camera application 110.

In some embodiments, the input vector 602 includes data related to a shape of a photo library associated with the camera application 110 and stored in the non-volatile memory 120 of the computing device 102. The shape of the photo library can refer to, for example, a number of photos stored in the photo library, a size of the memory storage space allocated to the photo library, a description of the type of files stored in the photo library (e.g., a ratio of image files to video files, an average files size of image files, a preferred CODEC selected for a majority of image files, etc.). In other embodiments, the input vector 602 can include personal information data collected from the computing device 102. For example, the personal information data can reflect a profile of times the camera application 110 is active, a profile of locations indicating where the camera application 110 has been used, and so forth. The personal information data can be obfuscated during collection to attempt to preserve the confidentiality of the user, such as by removing as much personally identifying information as possible by disguising the location data (e.g., translating GPS coordinates into city/state/country indicators), quantizing time data to large time scales (e.g., morning/afternoon/evening/night), and so forth. In addition, any correlation of the personal information data to a particular computing device or user account can be obscured to the extent possible by, e.g., using ephemeral identifiers that are not tied to any other user account or information that could be used to connect the personal information data to a particular user. Furthermore, to the extent any personal information data may be transmitted to a network-based service, such personal information data can be encrypted and authenticated using encryption keys negotiated between the computing device 102 and the service and certificates maintained by a certificate authority.

FIG. 7 illustrates a method 700 for managing the allocation of storage space within a storage device, in accordance with some embodiments. The method 700 can be implemented by hardware, software, or some combination of hardware and software. For example, in some embodiments, the method 700 is implemented by a processor 104 of a computing device 102 executing the camera application 110, the cache engine 112, and, optionally, the machine learning engine 114 as well as one or more additional applications 116.

At 702, an amount of available memory storage space in a non-volatile memory is determined. In some embodiments, a storage controller 214 of a camera application 110 queries a file system or an operating system 108 to determine the amount of available memory storage space within a non-volatile memory 120. In some embodiments, the non-volatile memory 120 is implemented as a block device, and the operating system 108 maintains a mapping table that indicates whether blocks of memory in the block device are allocated or free. Counting the number of free blocks of memory can be utilized to determine the amount of available memory.

In some embodiments, checking the amount of available memory storage space within the non-volatile memory is initiated responsive to a triggering event. The triggering event can be at least one of launching or resuming the camera application within an operating environment of the computing device; changing a mode of operation of the camera application; changing configuration parameters for a particular mode of operation; initiating a capture of image data for an image file or video file via a user interface of the camera application; providing an image file or a video file to a library service; or terminating capture of image data for the image file or the video file. In some embodiments, the storage controller 214 triggers the memory check. In other embodiments, the storage controller 214 receives a notification of the triggering event. For example, a file system can send a notification to the storage controller whenever the amount of available memory storage space has been modified.

In some embodiments, the triggering event can be rate limited. In other words, the triggering event causes the method 700 to be executed. However, the method 700 should only be executed multiple times if a minimum amount of time has passed since the last attempt to free memory storage space in the non-volatile memory 120. For example, the camera application 110 can be configured to only attempt to execute the method 700 once per 10 seconds, once per minute, or so forth. In some embodiments, each time a triggering event is detected, a timer is reset. A subsequent triggering event can only be detected subsequent to the expiration of the timer.

At 704, the amount of available memory storage space is compared with a threshold value. In some embodiments, the threshold value represents a target threshold value. The target threshold value can be greater than a critical threshold value that is indicative of a level of available memory storage space that is insufficient to complete operations within the camera application. The target threshold value represents a level of available memory storage space that is estimated to be sufficient to complete operations within the camera application.

In some embodiments, the threshold value is dynamically adjusted based on historical user data related to the camera application. In other embodiments, the threshold value is dynamically adjusted based on a machine learning algorithm that is trained utilizing historical user data related to the camera application on a plurality of different computing devices. In some embodiments, the threshold value is selected from one of a plurality of threshold values based on a mode of operation of the camera application.

At 706, a request is transmitted to a service to free additional memory storage space within a temporary data store associated with one or more applications installed on the computing device. In some embodiments, the service is a cache engine 112 configured to manage the temporary data store for the one or more applications. The cache engine 112 can transmit requests to the one or more applications to free memory storage space allocated to the application(s) in order to increase the amount of available memory storage space within the non-volatile memory 120.

In some embodiments, the cache engine 112 selects one or more applications to request a reduction in data in the temporary data store based on a priority value assigned to each application. The priority value can indicate whether the application is likely to comply with the request or, alternately, how frequently the application is accessed by a user of the computing device. In some embodiments, the priority value is based on responses from each of the one or more applications to previous requests to delete data from the temporary data store.

In some embodiments, the method 700 can be implemented within a software driver that implements an application programming interface (API) that can be utilized by a third-party camera application to store photos or videos within a non-volatile memory. The software driver is configured to manage the temporary data store 304 in a manner that is transparent to the third-party camera application. In other embodiments, the functionality of method 700 can be provided to a developer as part of a software framework that defines constructors, methods, data structures, and the like for including the functionality of method 700 within a third-party application that utilizes an image sensor of the computing device to capture image data.

Figure 8:
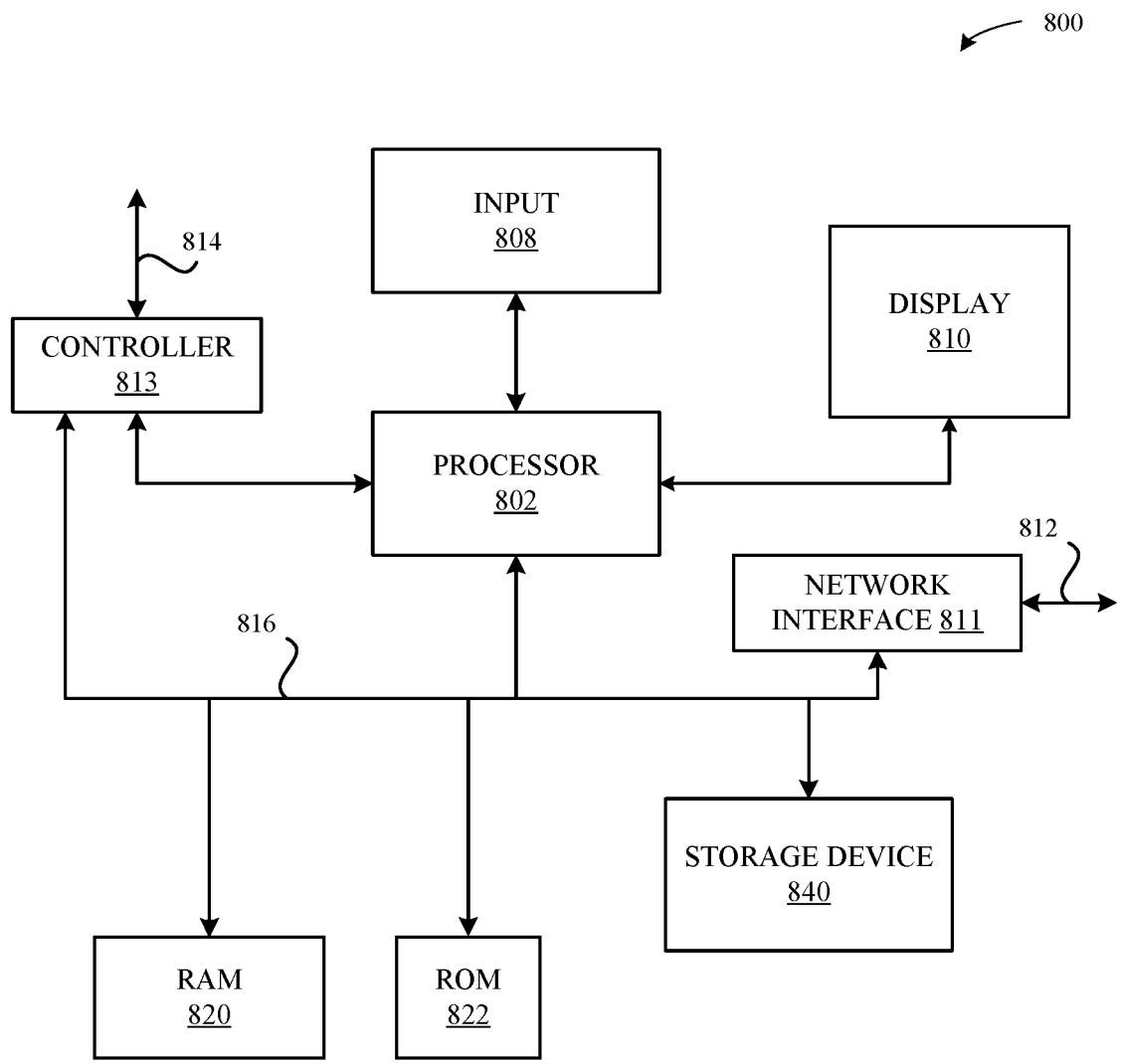
FIG. 8 illustrates a detailed view of a computing device that can be used to implement the various techniques described herein, in accordance with some embodiments.

FIG. 8 illustrates a detailed view of a computing device that can be used to implement the various techniques described herein, in accordance with some embodiments. In particular, the detailed view illustrates various components that can be included in the computing device 102 illustrated in FIG. 1. As shown in FIG. 8, the computing device 800 can include a processor 802 that represents a microprocessor or controller for controlling the overall operation of the computing device 800.

The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, and so on. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include a wireless transceiver.

As noted above, the computing device 800 also include the storage device 840, which can comprise a single disk or a collection of disks (e.g., hard drives), and includes a storage management module that manages one or more partitions within the storage device 840. In some embodiments, storage device 840 can include flash memory, semiconductor (solid state) memory, volatile memory (e.g., any variety of RAM), non-volatile random access memory (RAM), or any combination thereof. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of applications executing on the computing device 102, including operating system 108, camera application 110, cache engine 112, machine learning engine 114, applications 116, and the like.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

As described above, one aspect of the present technology is the gathering and use of data available from various sources to improve the operation of a camera application. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify different threshold values for a camera application based on user location or schedule. Accordingly, use of such personal information data prevent unnecessary deletion of cache data based on user behavior. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of contact discovery services, the present technology can be configured to allow users to select to "opt in" or "opt out" of participation in the collection of personal information data during registration for services or anytime thereafter. In another example, users can select not to provide access to location data that could enable the camera application to track a user's location. In yet another example, users can select to limit access to a snapshot of the user's non-volatile memory. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information. The services may simply operate without incorporating personal information data into a process for selecting or setting threshold values dynamically, as described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing available storage space to enable continued operation of a camera application executing on a computing device, the method comprising, at the computing device:
    receiving, from the camera application, a request to increase available storage space in a storage device with which the computing device is communicably coupled; and
    in response to the request:
        identifying, among a plurality of applications that are distinct from the camera application, at least one application to which an auxiliary request to delete cached data associated with the at least one application should be transmitted, wherein:
            each application of the plurality of applications is associated with a respective priority value that represents a respective historical rate of responsiveness by the application to at least one previous request to delete cached data, and
            the plurality of applications is ordered based on the respective priority values; and
        issuing the auxiliary request to the at least one application, wherein the auxiliary request specifies an amount of the cached data to be deleted that is based on a threshold value associated with the request.

2. The method of claim 1, wherein the camera application issues the request in response to detecting a triggering event.

3. The method of claim 2, wherein the triggering event comprises at least one of:
    launching or resuming the camera application within an operating environment of the computing device;
    changing a mode of operation of the camera application;
    changing configuration parameters for a particular mode of operation of the camera application;
    initiating a capture of image data for an image file or a video file via a user interface of the camera application;
    providing an image file or a video file to a library service; or
    terminating capture of image data for the image file or the video file.

4. The method of claim 2, wherein the triggering event is rate-limited such that requests to increase available storage space are throttled when one or more conditions are satisfied.

5. The method of claim 1, wherein the threshold value is dynamically adjusted based on historical user data related to the camera application.

6. The method of claim 1, wherein the threshold value is dynamically adjusted based on a machine learning algorithm that is trained utilizing historical user data related to camera applications on a plurality of different computing devices.

7. The method of claim 1, wherein the threshold value is selected from one of a plurality of threshold values based on a mode of operation of the camera application.

8. The method of claim 1, wherein:
    the cached data includes a plurality of files;
    each file of the plurality of files is associated with a respective priority level; and
    the auxiliary request indicates a priority level of files to be deleted.

9. The method of claim 1, further comprising:
    receiving, from the at least one application, an indication of whether the at least one application was able to delete the amount of the cached data; and
    updating the respective priority value associated with the at least one application based on the indication.

10. The method of claim 1, wherein the threshold value is adjusted based on at least one of a location of the computing device, a time, or a date.

11. A computing device configured to manage storage space in a non-volatile storage to improve operation of a camera application, the computing device comprising:
    the non-volatile storage that includes a temporary data store for one or more applications;
    at least one processor; and
    a volatile memory configured to store instructions that, when executed by the at least one processor, cause the computing device to:
        receive, from the camera application, a request to increase available storage space in a storage device with which the computing device is communicably coupled; and
        in response to the request:
            identify, among a plurality of applications that are distinct from the camera application, at least one application to which an auxiliary request to delete cached data associated with the at least one application should be transmitted, wherein:
                each application of the plurality of applications is associated with a respective priority value that represents a respective historical rate of responsiveness by the application to at least one previous request to delete cached data, and
                the plurality of applications is ordered based on the respective priority values; and
            issue the auxiliary request to the at least one application, wherein the auxiliary request specifies an amount of the cached data to be deleted that is based on a threshold value associated with the request.

12. The computing device of claim 11, wherein the camera application issues the request in response to detecting a triggering event.

13. The computing device of claim 12, wherein the triggering event comprises at least one of:
    launching or resuming the camera application within an operating environment of the computing device;
    changing a mode of operation of the camera application;
    changing configuration parameters for a particular mode of operation of the camera application;
    initiating a capture of image data for an image file or a video file via a user interface of the camera application;
    providing an image file or a video file to a library service; or terminating capture of image data for the image file or the video file.

14. The computing device of claim 12, wherein the triggering event is rate-limited such that requests to increase available storage space are throttled when one or more conditions are satisfied.

15. The computing device of claim 11, wherein the threshold value is dynamically adjusted based on historical user data related to the camera application.

16. The computing device of claim 11, wherein the threshold value is dynamically adjusted based on a machine learning algorithm that is trained utilizing historical user data related to camera applications on a plurality of different computing devices.

17. The computing device of claim 11, wherein the threshold value is selected from one of a plurality of threshold values based on a mode of operation of the camera application.

18. At least one non-transitory computer readable storage medium configured to store instructions that, in response to being executed by at least one processor included in a computing device, cause the computing device to manage storage space in a non-volatile storage to improve operation of a camera application, by carrying out steps that include:
    receiving, from the camera application, a request to increase available storage space in a storage device with which the computing device is communicably coupled; and
    in response to the request:
        identifying, among a plurality of applications that are distinct from the camera application, at least one application to which an auxiliary request to delete cached data associated with the at least one application should be transmitted, wherein:
            each application of the plurality of applications is associated with a respective priority value that represents a respective historical rate of responsiveness by the application to at least one previous request to delete cached data, and
            the plurality of applications is ordered based on the respective priority values; and
        issuing the auxiliary request to the at least one application, wherein the auxiliary request specifies an amount of the cached data to be deleted that is based on a threshold value associated with the request.

19. The at least one non-transitory computer readable storage medium of claim 18, wherein the camera application issues the request in response to detecting a triggering event.

20. The at least one non-transitory computer readable storage medium of claim 19, wherein the triggering event comprises at least one of:
    launching or resuming the camera application within an operating environment of the computing device;
    changing a mode of operation of the camera application;
    changing configuration parameters for a particular mode of operation of the camera application;
    initiating a capture of image data for an image file or a video file via a user interface of the camera application;
    providing an image file or a video file to a library service; or
    terminating capture of image data for the image file or the video file.

\* \* \* \* \*